Feb. 4, 1969     L. A. COONEY ET AL     3,425,222

FLUID PRESSURE BRAKING SYSTEM

Filed May 25, 1966     Sheet 1 of 5

INVENTORS
LEO A. COONEY
MARCO NOBILI

BY
Burton & Parker
ATTORNEYS

Feb. 4, 1969  L. A. COONEY ET AL  3,425,222
FLUID PRESSURE BRAKING SYSTEM

Filed May 25, 1966  Sheet 3 of 5

INVENTORS
LEO A. COONEY
MARCO NOBILI
BY
Burton & Parker
ATTORNEYS

INVENTORS
LEO A. COONEY
MARCO NOBILI
BY
Burton & Parker
ATTORNEYS

United States Patent Office 3,425,222
Patented Feb. 4, 1969

3,425,222
FLUID PRESSURE BRAKING SYSTEM
Leo A. Cooney and Marco Nobili, Grosse Pointe, Mich., assignors to Hydroease Corporation, Grosse Pointe, Mich., a corporation of Michigan
Filed May 25, 1966, Ser. No. 552,961
U.S. Cl. 60—54.6
Int. Cl. F15b 7/08, 15/00
4 Claims

ABSTRACT OF THE DISCLOSURE

The provision in a vehicle braking system of an integral, self-contained unit including a master cylinder and fluid reservoir therefor together with a pressure booster unit incorporating a pair of interfitting, stepped pistons received within a stepped bore and including valve means operable to permit straight through fluid flow during initial movement of master cylinder piston and responsive to booster piston movement to interrupt such straight through flow and thereby multiply pressure fluid in the load lines. The reservoir, master cylinder, and pressure booster cylinder are arranged in gravity flow communication, with passageway means establishing secondary communication between the reservoir and the larger end of the stepped bore on the booster cylinder to permit bypassed fluid return to the reservoir, thus eliminating any leakage of the fluid from the self-contained unit.

---

This invention relates to braking systems, and more particularly to a fluid pressure booster integrated into an hydraulic brake system.

What may be termed convention brake systems include a master hydraulic cylinder and individual wheel cylinders connected thereto by fluid lines, with a master cylinder piston shifted in its chamber by a brake pedal or the like to deliver pressure fluid to the wheel cylinders, which are actuated to shift the brake shoes against their respective drums. It is well known that clearance between shoes and drums necessitates a master cylinder of relatively large capacity, and that the range of pressure multiplication possible by variation of the ratio between master and wheel cylinder diameters is limited. Various pressure boosting devices have been proposed to provide higher pressures at the wheel cylinders while utilizing the master cylinders to deliver the large volume of fluid required.

It is an object of the present invention to provide a self-contained master cylinder pressure-booster unit which is of simple yet sturdy construction and which may be used in virtually any hydraulic braking system.

Another object is the provision of a unit of the character described wherein the master cylinder, pressure booster and a fluid reservoir are all enclosed in a single housing, which may be conveniently cast or formed of one piece of metal, thereby contributing greatly to economy of manufacture.

A further object is the provision of such a device wherein the housing is so formed and the master cylinder and pressure booster are so arranged therein to facilitate charging and bleeding of the system, and to eliminate the possibility of air entrapment either during filling of the device or while it is in use.

Another object is the provision of a self-contained unit of the above description which is adaptable for use with the various conventional brake systems, including power brake systems and those which utilize more than one master cylinder, as for example a system having a master cylinder for the front wheel brakes and another for the rear wheel brakes of the vehicle.

Other objects, advantages and meritorius features will more fully appear from the following specification, claims and accompanying drawings, wherein:

Figure 2:
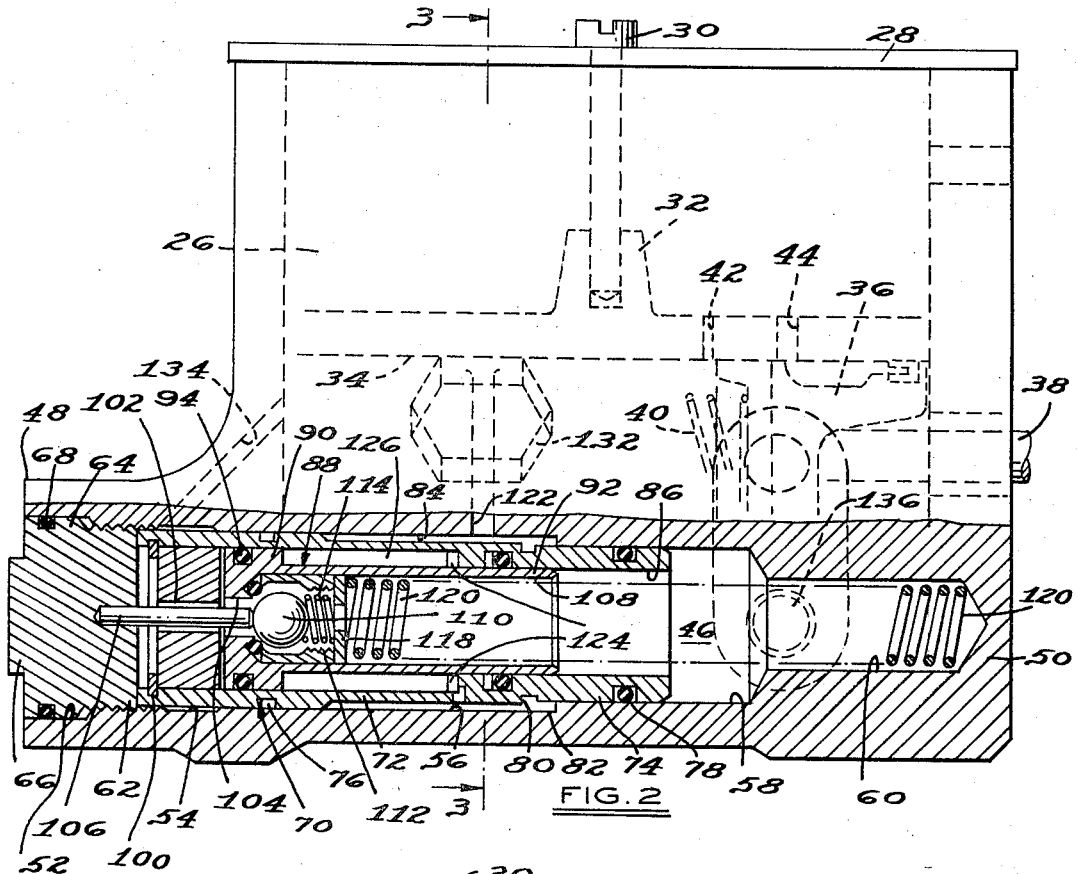
FIG. 2 is a side elevation, partly in section, of the device shown in FIG. 1.
Figure 1:
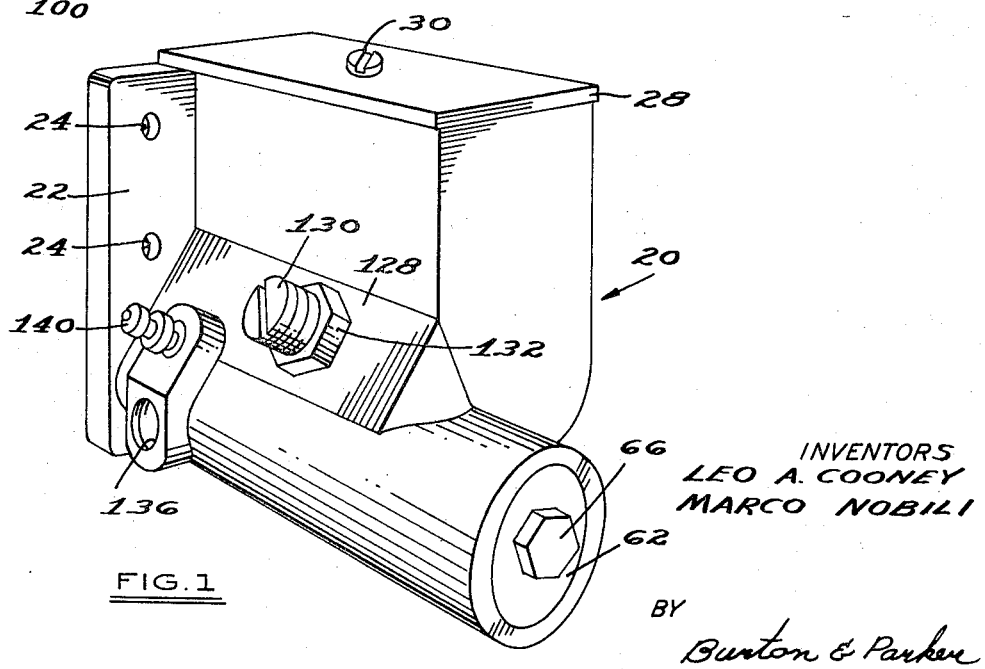
FIG. 1 is a perspective view of an integral master cylinder and booster combination embodying the invention.
Figure 3:
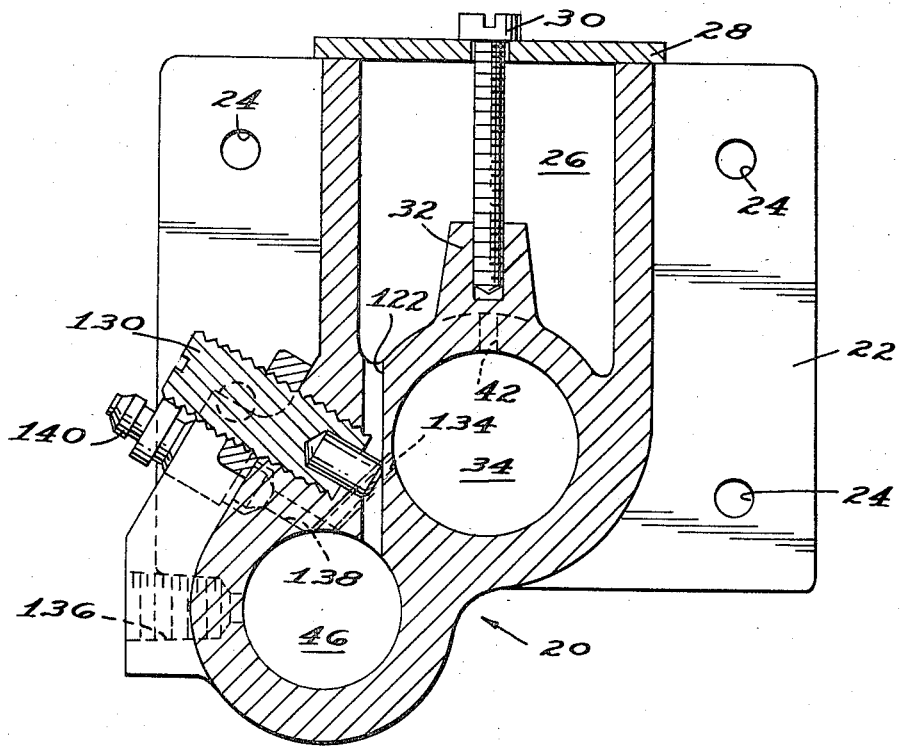
FIG. 3 is a cross-sectional view taken along the line 3—3 of FIG. 2.

Referring now more particularly to the drawings, and directing attention first to FIGS. 1–3, there is shown a device embodying the invention including a housing 20 within which is contained all of the operative parts of the device. Housing 20 is preferably a single casting having an integral plate-like mounting member 22 at one end thereof provided with spaced apertures 24 through which mounting means such as bolts or the like may be extended to mount the device on the fire wall of the automotive vehicle. Housing 20 is open at the top, and the upper portion of the housing defines a reservoir 26 providing fluid for the device. A cover plate 28 closes the top of the reservoir 26 and is held in place thereon by a machine screw 30 which is threadedly engaged within an upstanding boss 32 as shown in FIG. 3. Spaced below the reservoir 26 in the housing 20 there is provided a smooth cylinder 34 which has an open end extending through the plate 22, and which is closed at its opposite end. Within the cylinder 34, which may be termed the master cylinder, there is disposed a piston 36 shiftable by a brake pedal rod 38 against the spring 40 which tends to restore the piston to its normally retracted position to the right of the cylinder as shown in FIG. 2. Pressure fluid is suppied to the master cylinder 34 from the reservoir 26 through an internal passage 42 opening into the master cylinder immediately ahead of the piston 36 when in its retracted position. A second fluid passage 44 serves as a return for pressure fluid as the piston 36 retracts from a power stroke.

Spaced below and laterally offset master cylinder 34 is a stepped bore 46 which opens through one end 48 of the housing as shown in FIG. 2. The opposite end 50 of the bore 46 is closed, as shown at 50. Opening 46 comprises a plurality of co-axial bores of decreasing diameter proceeding from the end 48 to the end 50 thereof, and such bores are indicated by the numerals 52, 54, 56, 58, and 60. The large or low pressure end of the bore is sealed by an externally threaded plug member 62 engageable with a threaded length on bore 54, the plug having a smooth cylindrical portion 64 slidably received in the bore 52. Plug 62 also has a projecting head portion 66, preferably hexagonally shaped for engagement by a wrench to facilitate assembly. Adjacent head 66 portion 64 exhibits an annular groove within which is positioned a sealing ring 68 for sealing the plug in the housing.

Within the bores 56 and 58 there is disposed for reciprocation a stepped hollow piston 70 having major and minor bearing portions 72 and 74 engaging the walls of the bore, each bearing portion provided with an external groove accommodating a sealing ring shown at 76 and 78 respectively. Piston 70 defines a peripheral shoulder 80 adapted to abut an opposing stop shoulder 82 between bores 56 and 58 to limit the travel of piston 70 on its power stroke to the right as shown in FIG. 2.

Hollow piston 70 defines interiorly thereof a rearward major bore 84 and a forward minor bore 86 providing cylindrical surfaces for sliding reception of a second stepped hollow piston 88 positioned for reciprocal movement relative to piston 70. Piston 88 is provided at its rearward end with a larger diameter 90 and at its forward end with a smaller diameter 92, and seals are provided between the pistons 70 and 88, one of which 94 is disposed in an external groove in portion 90 of piston 88, and the other of which 96 is disposed in an internal groove in the portion 74 of piston 70. A cylindrical block member 98 is slidably received in bore 84 and backs up piston 88, and is retained within piston 70 by a snap ring 100 disposed in an internal annular groove in the piston 70. Block 98 and piston portion 90 are provided with co-axial fluid passageways 102 and 104 respectively through both of which extends a pin 106 press fitted in member 62. The forward end 92 of piston 88 is bored out as shown at 108, and accommodates a check valve assembly comprising a ball 110, a ball retainer 112 and a spring 114. An annular sealing member 116 entrapped between the retainer 112 and a groove in piston portion 90 serves as a sealing seat for the ball 110, which is urged theretoward by spring 114. The ball check assembly is retained within the piston bore 108 by an apertured washer 118 pressed into the piston bore. Both the retainer 112 and the washer 108 may be, and preferably are, provided with axially extending cut outs to insure completely free fluid flow through the check valve assembly when the ball check 110 is open. A coil spring 120 is received within the inner piston bore 108 and urges the pistons 70 and 88 to their retracted positions shown in FIG. 2, the opposite end of spring 120 being guidably received within the bore 60 and bearing against the end wall 50.

With the pistons 70 and 88 in their extreme retracted position, pin 106 abuts ball 110, holding it away from its seat, and straight through fluid communication is maintained. The extreme rearward end of outer piston portion 72 is apertured to provide communication between bore 54 and the central fluid passages 102 and 104 as shown in FIG. 2.

As can be seen most clearly in FIG. 3, a fluid passage 122 is provided, establishing fluid communication between reservoir 26 and bore 46. Turning to FIG. 2, it can be seen that the passage 122 communicates with the enlarged bore 56. Outer piston 70 is provided with a pair of diametrically opposed orifices 124 so that fluid communication is established between the space 126 between the pistons 70 and 88, and the passage 122, so that fluid entrapped between the two pistons or between the outer piston and the bore 56 is exhausted through passage 122 to the reservoir 26, obviating the build-up of pressure during forward travel of the pistons.

Extending through an inclined face 128 on the housing 20 and projecting into passageway 122, is a lock-out screw 130, the nose of which projects into the passage 122, and can be operated as a valve to open and close the passageway. A hex nut or the like 132 threaded on to the lock-out screw is tightened against the housing 20 to lock the screw in any desired position. A fluid passage 134 establishes communication between cylinder 34 and the low pressure or large end 54 of chamber 46. At the opposite end of chamber 46, in the area of bore 60, there is provided an outlet 136 which is internally threaded to accommodate a fitting for connection to the fluid lines leading to the individual brake cylinders on the vehicle. A bleed port 138 opens into the top of the bore spaced circumferentially from port 136, and includes an internally threaded portion accommodating a bleeder valve 140 as shown in FIGS. 1 and 3. The operation of the device will now be described with reference to FIGS. 1–3. Assuming that the device has been charged with hydraulic fluid, and the connecting brake lines and individual wheel cylinders are also filled with fluid, the system is ready for operation. The device is normally mounted in a horizontal position in the engine compartment of the vehicle by means of bolts or the like extending through the apertures 24 and housing flange 22, positioned so that brake pedal rod 38 is in axial alignment with the master cylinder piston 36. In the normal at rest position, master cylinder piston 36 is retained in its retracted position under the influence of spring 40 while pistons 70 and 88 in chamber 46 are maintained in their retracted positions by spring 120. Initial pressure on the vehicle brake pedal (not shown) shifts rod 38 to move master cylinder piston 36 to the left as shown in FIG. 2 forcing hydraulic fluid through passage 134 into chamber 46 and out through outlet 136 to the individual wheel cylinders to move the brake shoes from their retracted position into initial contact with the brake drums or the like. During this first stage of the operation, pistons 70 and 88 are in their fully retracted positions as shown in FIG. 2, and straight through communication is established between the master cylinder 34 and the outlet 136, as the pin 106 bears against the ball check 110, holding it away from its seat within piston 88. As the force required to shift the brake shoes from their retracted position into initial contact with their respective drums is relatively small, the transfer of fluid under pressure from the master cylinder to the individual brake cylinders is accomplished with check valve 110 open, with the master cylinder piston 36 providing sufficient fluid pressure to accomplish brake shoe travel, even with a relatively light pressure being applied to the vehicle brake.

As the brake shoes shift into contact with the brake drums, a much greater fluid pressure is required to shift the shoes firmly against the drums for stopping the vehicle. Additional force exerted on the brake pedal by the vehicle operator creates a substantially uniform increase in fluid pressure throughout the system. With the ball check 110 open, the fluid pressures on opposite sides of the pistons 70 and 88 are equal, the pistons initially being held in their retracted positions by spring 120. However, the total effective areas of the pistons at their forward ends is less than the total effective area at their rear ends. Therefore, at a predetermined level of fluid pressure entering bore 54 through passage 134 the force exerted against the rear face of the pistons will exceed the sum of the fluid forces acting against the piston front ends plus the restoring force of spring 120. At this point, the pistons 70 and 88 will begin to shift forwardly (from left to right as shown in FIG. 2) seating ball check 110 against its sealing seat within piston 88. This initial movement of the pistons to seat the ball check may be characterized as a floating action, because the passages through the pistons are open. Once the ball member 110 seats, the fluid passages through the pistons are closed, and any further forward movement of the pistons results in an elevation of fluid pressure within the chamber 46 forwardly of the pistons, and a resultant increase in pressure throughout the line and wheel cylinders of the braking system.

If the area forwardly of the pistons 70 and 88 be considered a pump chamber, it is clear that the movement of the two pistons conjointly will effect a pressure increase in the pump chamber, and that the ratio of fluid pressure in the master cylinder to that in the pump chamber is equal to the ratio of the effective areas of the rear end front faces of the pistons. This ratio or pressure differential, when the pistons are moving conjointly, is equal to the square of the diameters of bores 56 and 58 in the chamber 46, and therefore the ratio may be varied to suit the needs of a particular system by varying the diameters of the bores and the diameter of outer piston 70. As the piston and bore diameters are directly related to the volume of pressure fluid in the chambers, variation in the bore diameter results in a corresponding variation in the volume of fluid necessary to shift the pistons a predetermined distance. Hence the amount of master cylinder piston travel, and ultimately brake pedal travel, will depend upon the aforesaid diameters, and the optimum brake pedal travel for a given braking action may be achieved within limitations by the selection of proper relationships.

Referring further to FIG. 2, when the fluid pressure in the master cylinder, and hence the pressure acting against the rear face of inner piston 88 exceeds the restoring force of spring 120 plus the fluid pressure acting against the front face of piston 88, such piston will move forwardly in the pump chamber independently of outer piston 70. This compound action or further pressure boost is usually accompanied by outer piston 70 retracting to provide a reaction pressure which increases the pressure in the motor chamber, tending to equalize the opposite forces on the outer piston while increasing the effective pressure of inner piston 88. Release of the brake pedal and retraction of master cylinder piston 36 by spring 40 during any of the braking stages results in an almost instantaneous decrease of pressure against the rearward faces of the pistons 70 and 88 and allows them to retract under the influence of spring 120, opening ball check 110 and re-establishing straight through communication between the master cylinder and the lines of the system.

Figure 4:
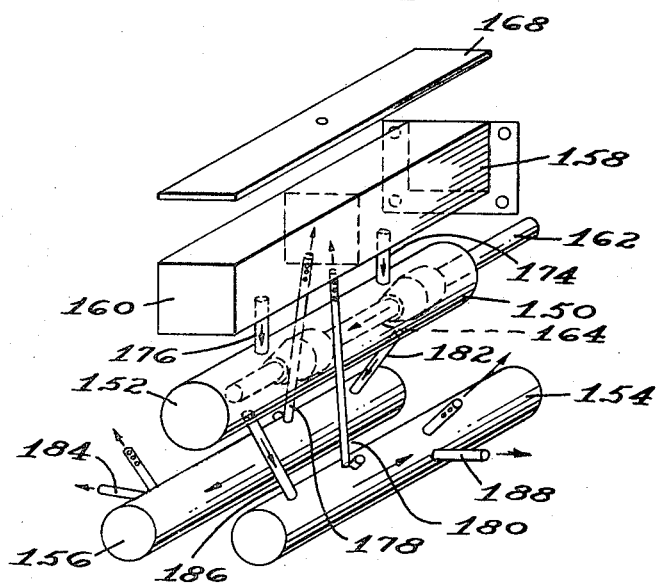
FIG. 4 is a schematic representation of another embodiment of the invention incorporating a double master cylinder with in-line pistons.
Figure 5:
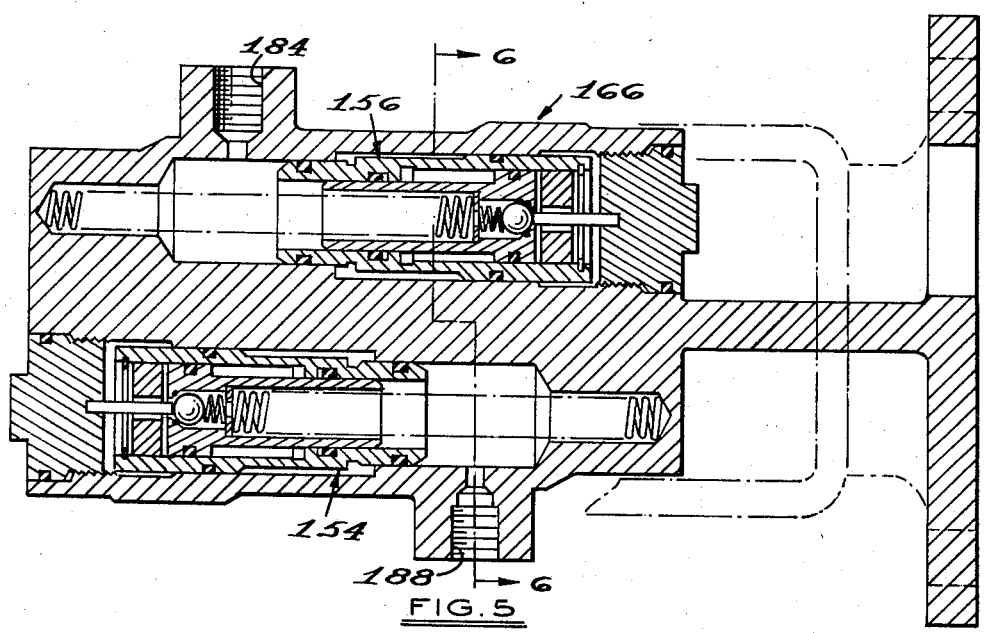
FIG. 5 is a longitudinal section showing the booster portion of the device schematically illustrated in FIG. 4, and taken along the line 5—5 of FIG. 6.
Figure 6:
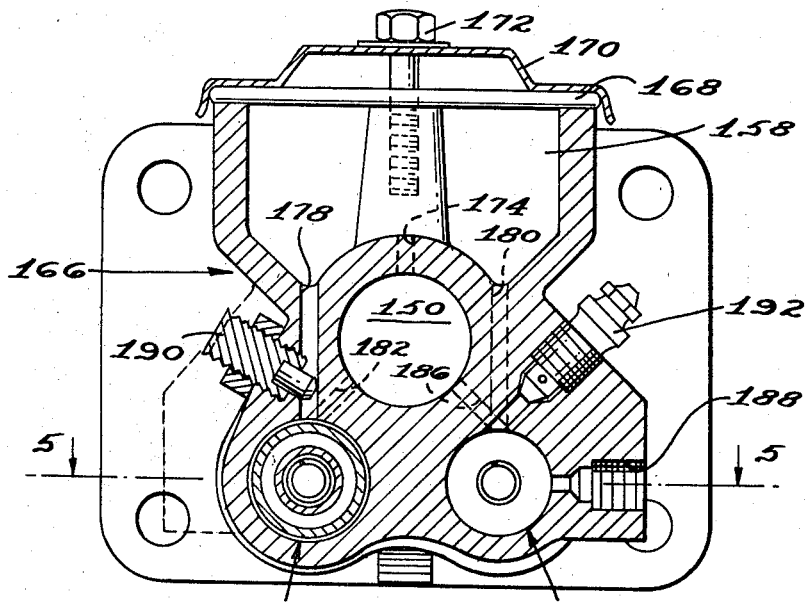
FIG. 6 is a cross-sectional view taken along the line 6—6 of FIG. 5.

Turning now more particularly to FIGS. 4, 5 and 6, there is shown schematically in FIG. 4 the device embodying the invention which includes a pair of aligned master cylinders 150 and 152, and a pair of pressure boosters 154 and 156, each connected to a respective master cylinder. Also provided are a pair of fluid reservoirs 158 and 160, one for supplying fluid to each master cylinder 150 and 152. Such an arrangement may be advantageously employed wherein it is desired to have a functionally separate unit for controlling each of the front wheel brakes and rear wheel brakes. A brake pedal rod 162 is coupled to the master cylinder piston in the rear cylinder 150, which is in turn coupled as at 164 to the piston of the forward cylinder 152, so that upon actuation of the brake pedal rod 162, both master cylinder pistons are advanced to apply the brakes to both the front and rear wheels of the vehicle. As can be seen more clearly in FIGS. 5 and 6, a housing 166 provides an enclosure for the various portions of the device shown schematically in FIG. 4. The reservoir 158 is provided with a cover plate 168 which is in turn surmounted by a dust cover 170, with the plate and cover being secured to the housing by a bolt or the like 172. Reservoir 158 is divided into two separate compartments, as shown in FIG. 4, the rear portion 158 communicating with master cylinder 150 via passageway 174, and the forward reservoir 160 communicating with master cylinder 152 through passageway 176. Reservoir section 158 communicates with booster cylinder 156 through passageway 178, while reservoir section 160 communicates with booster cylinder 154 through fluid passage 180. Master cylinder 150 exhibits a passageway 182 at the forward end thereof communicating with the rear end of booster cylinder 156, which is in turn equipped with outlet passage 184 leading to the brake lines connected to the wheel cylinders or one pair of vehicle wheels. The forward end of master cylinder 152 is likewise connected to the rear end of booster cylinder 154 through fluid passage 186, and the booster 154 is provided with an outlet 188 connected to the fluid lines leading to the wheel cylinders on the remaining set of vehicle wheels.

A lock-out screw is provided for each of the booster cylinders 154 and 156 operable to close passages 178 and 180 respectively, one of such lock-out valves being shown at 190. Such is identical to the construction shown at 130 in FIG. 3. Similarly, each booster cylinder is provided with a lead valve, one of which is shown at 192 in FIG. 6 controlling booster 154, and such construction is identical to the lead valve 140 shown in FIG. 3.

The construction of the power boosters 154 and 156 is identical to the construction of the unit indicated at 46 in FIG. 2. Therefore the internal construction of these members will not be described in detail, it being understood that the description previously set forth for FIGS. 1–3 is equally applicable to FIGS. 4–6. Assuming that the rear master cylinder 150 controls the brakes for the rear wheels of the vehicle, and the forward master cylinder 152 controls the front wheel brakes of the vehicle, when the vehicle brake pedal is depressed, brake pedal rod 162 is advanced, shifting the pistons of master cylinders 150 and 152 in the direction of the arrow as shown in FIG. 4. Movement of the piston of master cylinder 150 forces pressure fluid through passage 182 to booster 156, and in the initial position of the booster as shown in FIG. 5, the fluid flows straight through and out through passage 184 to the brake lines. During this first stage of operation, the two stepped pistons within chamber 154 are in their fully retracted positions as shown in FIG. 5, and as the pressure in the chamber rises, the pistons begin a floating movement, closing the ball check within the inner piston and interrupting communication between passage 182 and outlet 184. When this occurs, further forward movement of the pistons in chamber 154 results in an elevation of fluid pressure within the chamber forwardly of the pistons and a resultant increase in pressure throughout the lines and the wheel cylinders of the braking system, such being identical to that heretofore described with reference to FIGS. 1–3. The pressure ratios developed by the system are directly related to the ratios of the pistons, and therefore an optimum pressure increase for a given system can be had by varying the diameters of both ends of the pistons.

As the master cylinder pistons move conjointly under the influence of brake pedal rod 162, simultaneously with the action described with respect to booster 156, the movement of master cylinder piston 152 causes pressure fluid to flow through passage 186 and booster chamber 154 to outlet 188. When the pressure build-up in chamber 156 exceeds a predetermined value, the ball check therein will be closed, and the stepped pistons in chamber 156 will be shifted to cause the elevation in fluid pressure forwardly of the pistons and a resultant increase in the pressure throughout the lines and wheel cylinders controlling the rear wheels of the vehicle.

Figure 7:
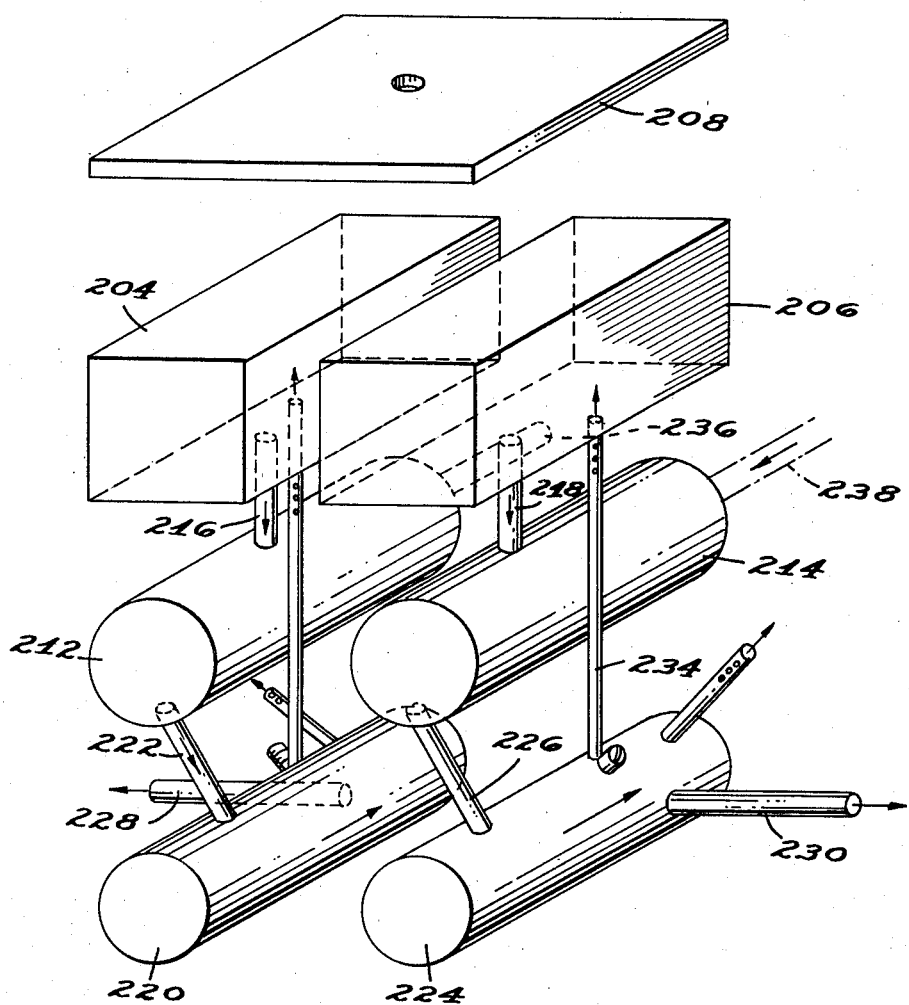
FIG. 7 is a schematic illustration similar to FIG. 4, but with the two master cylinders arranged side by side instead of in-line.
Figure 8:
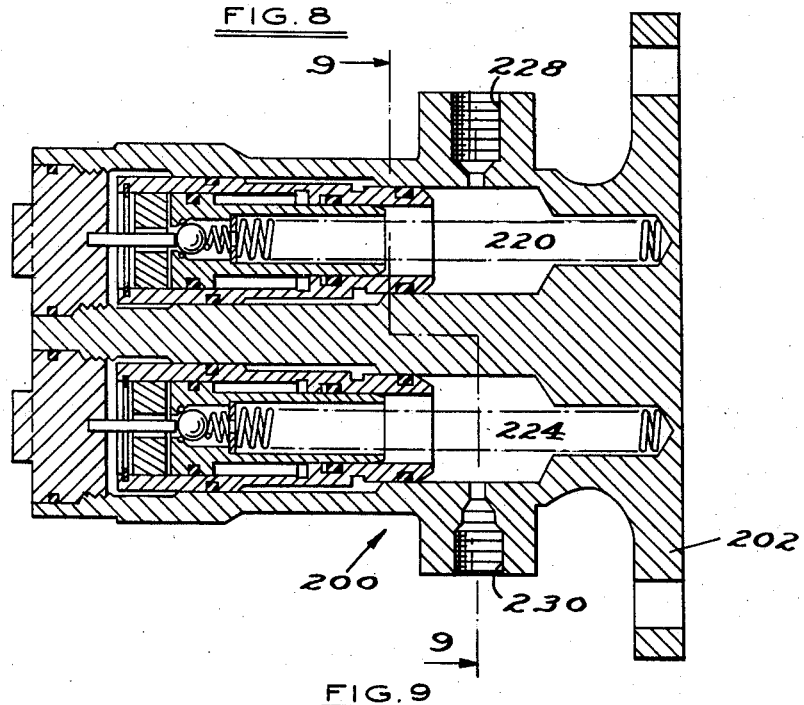
FIG. 8 is a longitudinal section of the booster portion of the device schematically illustrated in FIG. 7 taken along the line 8—8 of FIG. 9.
Figure 9:
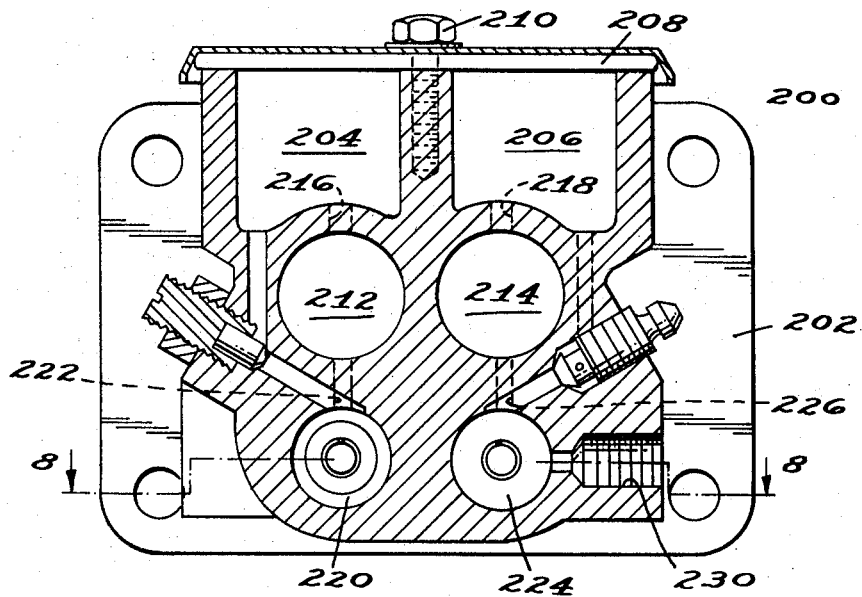
FIG. 9 is a cross section taken along the line 9—9 of FIG. 8.

In FIGS. 7–9 there is shown a device similar to that shown in FIGS. 4–6, the principal difference being that in FIGS. 7–9 the master cylinders are arranged side by side instead of in co-axial alignment. Referring to FIGS. 7–9, there is shown a housing 200 having an end plate member 202 for securement to the vehicle body. The upper end of the housing is provided with a pair of reservoirs 204 and 206 covered by a common cover plate 208 secured to the housing as by a bolt 210. Two master cylinders 212 and 214 are positioned below a respective reservoir, and are connected thereto by fluid passages 216 and 218. Each master cylinder is associated with a booster chamber, the cylinder 212 being connected to chamber 220 by fluid passage 222, and cylinder 214 being similarly connected to chamber 224 via passage 226. Boosters 220 and 224 are each provided with a fluid outlet as shown at 228 and 230 respectively. Each booster is in addition provided with a fluid passage 232 and 234 respectively, communicating at its upper end with the corresponding reservoir 204 and 206.

The device of FIGS. 7–9 functions in the same fashion as that shown in FIGS. 4–6, and the internal construction of the boosters 220 and 224 is identical to that previously described, except for the relative positions of the booster units. While in FIG. 5 the two units 154 and 156 are oppositely disposed, it can be seen from FIG. 8 that the units 220 and 224 are disposed in the same relative positions within the housing. Each master cylinder 212 and 214 is provided with a piston which is in turn coupled to a brake pedal rod shown at 236 and 238. It will be understood that the rods 236 and 238 may be coupled together for actuation by a single brake pedal. From FIG. 7 it can be seen that master cylinder 212 and associated booster 220 may control one set of vehicle brakes through line 228 while master cylinder 214 and booster 224 control another set of brakes through line 230.

In certain situations it may be desirable to provide a pressure booster system for only some of the vehicle wheels. For example, in a conventional automobile, if it were desired to provide a booster for only the front wheel brakes, the system of FIGS. 4–6 or the system of FIGS. 7–9 could be utilized having only one of the pressure booster units incorporated therein.

What is claimed is:

1. In a vehicle braking system, the combination comprising: an enclosed elongate housing adapted for mounting in a generally horizontal position having a mounting flange at one end thereof for securement to said vehicle; a chamber at the upper end of said housing defining a fluid reservoir; a longitudinal cylinder spaced below said reservoir and opening through said one end of the housing; a piston in said cylinder for connection to brake actuating means on the vehicle for movement from a retracted position adjacent said one end of the housing to an extended position; passage means establishing fluid communication between said reservoir and said cylinder ahead of said piston when retracted; a longitudinal stepped bore extending spaced below said cylinder; fluid passage means connecting the large end of said stepped bore with said cylinder and connecting the small end of said stepped bore to a load line; a first stepped piston fitting said stepped bore for reciprocation and defining an internal stepped bore opening through opposite ends thereof; a second stepped piston fitting said internal bore of the first piston for reciprocation therein and having an axial passage therethrough; means biasing said pistons toward an at rest position at the larger end of said stepped bores; valve means operable in said at rest position of the pistons to permit fluid flow therethrough and being closed upon movement of the pistons in a power stroke in response to a predetermined fluid pressure thereagainst from shifting of the piston in said cylinder; and further fluid passage means establishing communication between said reservoir and said stepped bore forwardly of the larger end of said stepped piston for returning pressure fluid bypassing said piston to the reservoir.

2. In a hydraulic vehicle braking system having brake actuating means extending through a wall of the vehicle, the combination comprising: an elongate enclosed housing having a peripheral mounting flange at one end thereof for securement of the housing to said vehicle wall; a longitudinal cylinder in said housing opening through said one end of the housing and closed at its opposite end; a piston in said cylinder connected to said brake actuating means to be shifted thereby in a power stroke from an at rest position at said one cylinder end toward said opposite cylinder end; a chamber in said housing defining a fluid reservoir with said cylinder in gravity flow communication therewith; a longitudinal bore in said housing having one end in flow communication with lines of said braking system cylinder and its opposite end in communication with said opposite end of said cylinder; a pair of pistons telescoped together within said bore for shiftable movement from an at rest position adjacent said opposite end of the bore toward said one end of the bore, each piston having a greater effective area exposed to pressure fluid from said cylinder than its effective area exposed to the lines of said braking system; means biasing said pistons toward said at rest position; valve means normally permitting free fluid communication between said cylinder and the braking system lines and operable in response to a predetermined pressure to interrupt such communication therebetween, whereby movement of said pistons in said bore effects an increased fluid pressure in said braking system lines, and a fluid passage between said reservoir and said bore spaced forwardly of the outer of said pistons when in at rest position to permit fluid bypassing the piston to be returned to said reservoir.

3. In a vehicle braking system, the combination comprising: an enclosed elongate housing having mounting means thereon for securement of the housing to the vehicle in a generally horizontal position; a longitudinal fluid pressure cylinder opening through one end of said housing, with a fluid pressure piston disposed for reciprocation therein and having means for connection of the piston to a brake actuator on said vehicle; a fluid reservoir in said housing above said cylinder; first fluid passage means establishing communication between said reservoir and said cylinder; a longitudinal stepped bore in said housing beneath said cylinder; second fluid passage means establishing communication between the larger end of said stepped bore and said cylinder; third fluid passage means establishing communication between the smaller end of said stepped bore and a load line; a pair of interfitting, cooperating stepped pressure booster pistons in said stepped bore defining an axial passage therethrough establishing communication between said second and third fluid passage means; means biasing said booster pistons toward an at rest position adjacent the larger end of said bore; valve means in said axial passage operable to close the passage upon movement of said booster pistons; and fourth fluid passage means establishing communication between said fluid reservoir and the larger end of said stepped bore forwardly of the piston in said bore whereby any pressure fluid bypassing such piston is exhausted to the reservoir.

4. The invention as defined in claim 3, characterized in that the outer one of said pair of interfitting pistons has an aperture therethrough intermediate to its opposite ends providing fluid conducting communication between the space between the pistons and said fourth fluid passage means to permit pressure bypassing the inner piston to be exhausted to said reservoir.

References Cited

UNITED STATES PATENTS

| | | |
|---|---|---|
| 3,010,282 | 11/1961 | Jansson. |
| 3,040,534 | 6/1962 | Hager. |

MARTIN P. SCHWADRON, *Primary Examiner.*

ROBERT R. BUNEVICH, *Assistant Examiner.*

U.S. Cl. X.R.

60—54.5